US011119643B1

(12) United States Patent
Madden

(10) Patent No.: US 11,119,643 B1
(45) Date of Patent: Sep. 14, 2021

(54) CONTEXTUAL QUICK PICK WHEEL

(71) Applicant: FORD GLOBAL TECHNOLOGIES, LLC, Dearborn, MI (US)

(72) Inventor: Thomas Madden, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/900,420

(22) Filed: Jun. 12, 2020

(51) Int. Cl.
G06F 3/0484 (2013.01)
G06F 3/0482 (2013.01)
G06F 3/0488 (2013.01)

(52) U.S. Cl.
CPC ........ G06F 3/04847 (2013.01); G06F 3/0482 (2013.01); G06F 3/04883 (2013.01)

(58) Field of Classification Search
CPC . G06F 3/04847; G06F 3/0482; G06F 3/04883
See application file for complete search history.

(56) References Cited

U.S. PATENT DOCUMENTS

| 8,375,326 | B2 | 2/2013 | Bucher et al. | |
| 9,158,422 | B2 | 10/2015 | Craig et al. | |
| 10,318,078 | B2 | 6/2019 | Okuzumi et al. | |
| 2008/0022228 | A1* | 1/2008 | Kwon | G06F 3/0482 715/838 |
| 2015/0370427 | A1* | 12/2015 | Zhang | G06F 3/04817 715/835 |
| 2017/0052617 | A1* | 2/2017 | Okuzumi | B60R 16/02 |
| 2018/0018027 | A1 | 1/2018 | Kowalk | |
| 2018/0373350 | A1* | 12/2018 | Rao | G06F 3/038 |
| 2019/0102058 | A1* | 4/2019 | Shen | G06F 3/0482 |

* cited by examiner

Primary Examiner — Seth A Silverman
(74) Attorney, Agent, or Firm — Michael J. Spenner; Brooks Kushman P.C.

(57) ABSTRACT

Responsive to a first selection input to a physical knob control, a menu is displayed at least partially surrounding the physical knob control, the menu having a plurality of menu item each associated with a respective action, the menu overlaying at least a portion of the onscreen controls and extending off-screen the touchscreen to allow menu items to be loaded from the sides of the touchscreen as the menu is rotated. A selection of the menu is set to an exit menu item to allow a second selection input to the physical control to dismiss the menu. Responsive to rotational input to the knob, the menu is rotated about the physical knob control to change the selection of the menu. Responsive to receipt of the second selection input, performing the action of the menu item at the selection.

20 Claims, 8 Drawing Sheets

CONTEXTUAL QUICK PICK WHEEL

TECHNICAL FIELD

Aspects of the present disclosure generally relate to a contextual quick pick wheel displayed on a touch screen in proximity to a physical knob control.

BACKGROUND

A touchscreen is a combination input and output device. A touch screen may include a display layer, such as a light-emitting diode (LED) screen or organic LED (OLED) screen, and a touch-sensitive layer, such as a capacitive touch or resistive touch layer. For quick operations in a vehicle, a physical control can provide a better user experience over a touch control. For example, physical controls require less visual interaction and can be used with gloved hands. However, for small vehicles with large touchscreens, there is limited space for physical controls.

SUMMARY

In one or more illustrative examples, a system for displaying a menu includes a touchscreen, configured to display onscreen controls and to receive touch input; a physical knob control, at least partially overlapping the touchscreen, additionally configured to receive touch input; and a processor. The processor is programmed to, responsive to a first selection input to the physical knob control, display a menu at least partially surrounding the physical knob control, the menu having a plurality of menu item each associated with a respective action, the menu overlaying at least a portion of the onscreen controls and extending off-screen the touchscreen to allow menu items to be loaded from the sides of the touchscreen as the menu is rotated, set a selection of the menu to an exit menu item to allow a second selection input to the physical control to dismiss the menu, responsive to rotational input to the knob, rotate the menu about the physical knob control to change the selection of the menu, and responsive to receipt of the second selection input, perform the action of the menu item at the selection.

In one or more illustrative examples, a method for displaying a menu is provided. Responsive to a first selection input to a physical knob control, a menu is displayed at least partially surrounding the physical knob control, the menu having a plurality of menu item each associated with a respective action, the menu overlaying at least a portion of the onscreen controls and extending off-screen the touchscreen to allow menu items to be loaded from the sides of the touchscreen as the menu is rotated. A selection of the menu is set to an exit menu item to allow a second selection input to the physical control to dismiss the menu. Responsive to rotational input to the knob, the menu is rotated about the physical knob control to change the selection of the menu. Responsive to receipt of the second selection input, performing the action of the menu item at the selection.

In one or more illustrative examples, a non-transitory computer-readable medium includes instructions that, when executed by a processor of a system including a touchscreen and a physical control knob at least partially overlapping the touchscreen, cause the processor to responsive to a first press input to a physical knob control at least partially overlapping a touchscreen, display a menu at least partially surrounding the physical knob control, the menu having a plurality of menu item each associated with a respective action, the menu overlaying at least a portion of the onscreen controls and extending off-screen the touchscreen to allow menu items to be loaded from the sides of the touchscreen as the menu is rotated; set a selection of the menu to an exit menu item to allow a second selection input to the physical control to dismiss the menu; responsive to rotational input to the knob, rotate the menu about the physical knob control to change the selection of the menu; and responsive to receipt of the second press input to the physical knob control, perform the action of the menu item at the selection.

DETAILED DESCRIPTION

Figure 1:
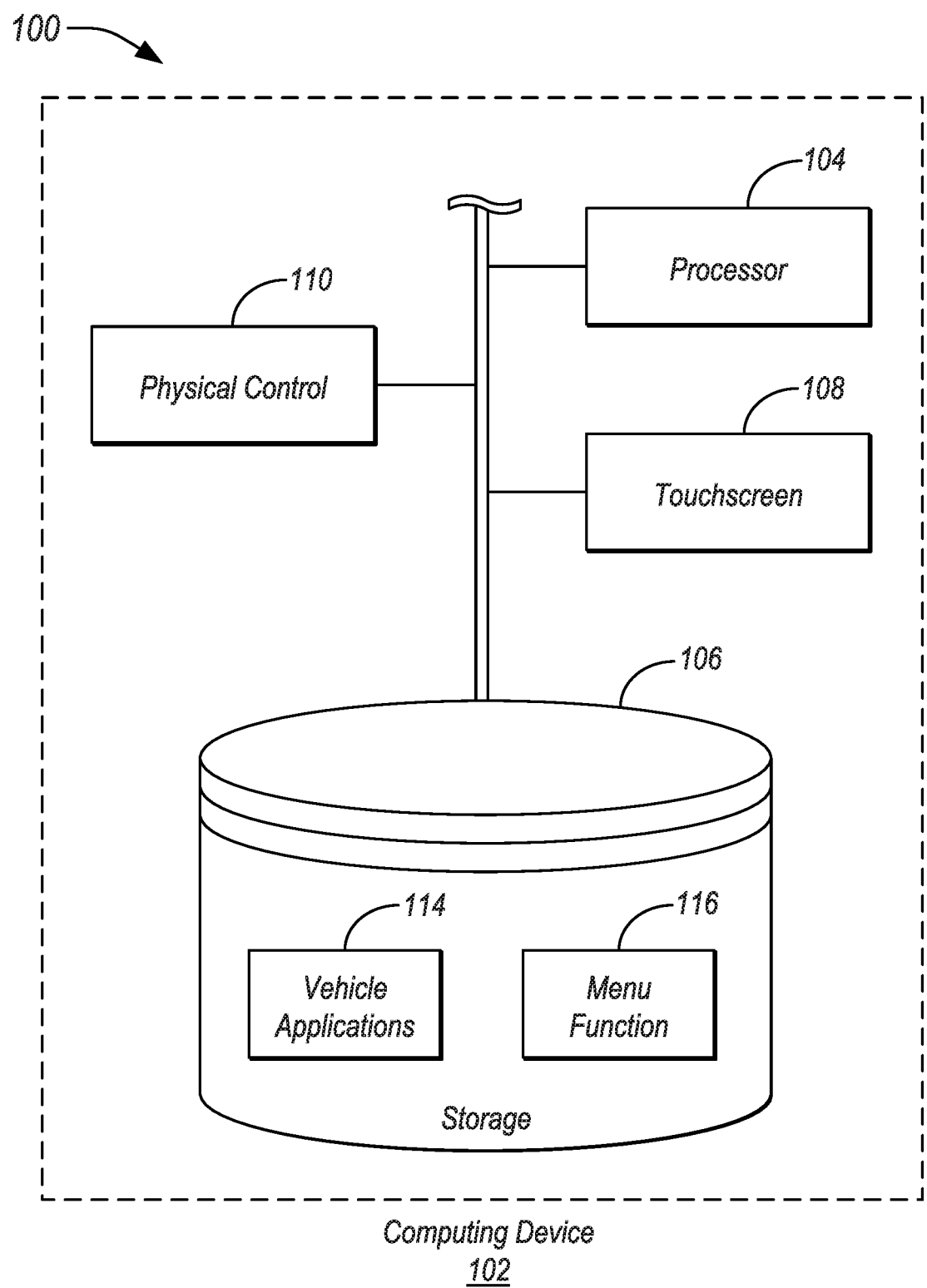
FIG. 1 illustrates an example system including a computing device for implementing a contextual quick pick wheel surrounding a physical control in proximity to a touchscreen.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

A touch display may include one or more physical controls that are inset into the touch display. These physical controls may include, as an example, a physical knob. The physical knob may respond to pressure as well as to rotational input. Due to space limitations in vehicle cabins, it may be desirable to surface a secondary method to actuate various vehicle features using the physical control. This secondary method may include display of a menu rendered to the touch display responsive to input received to the physical control. In an example, the menu may be displayed above other content provided to the touch display. In some examples, the menu may be at least degree transparent or translucent, allowing aspects of the underlying content to be shown through the menu. As explained in detail herein, display and operation of such a menu may provide a visually-stimulating and engaging user experience.

In one example, when the knob is pressed, a rotary menu may appear on the touch screen, surfacing various single-press quick-pick actions. As some possibilities, these actions may include to: (i) Tune to a radio station; (ii) Launch an application; (iii) Call home; (iv) Turn on the Max A/C; (v) Give me directions home. Rotating the knob clockwise or counterclockwise may be used to select an action. Pressing the knob again may perform the selected action.

By default, an exit item may be selected. This allows a user to quickly dismiss the menu should the user have accidentally entered the menu. Tapping on the touch screen anywhere outside of the menu may also cause the menu to be dismissed. The menu may also timeout after a period of inactivity and be automatically dismissed.

The included menu items may be a quick way to access features that are normally buried deeper within in the user interface. For instance, a shortcut to audio settings could be placed on the rotary menu that would take the user to audio settings that would otherwise be buried several layers deep in screens. In some examples, items deemed to be most likely for the user to access may be placed immediately to the left or right of the initially selected exit item, to minimize the amount of turning of the knob in either direction that would be required to select the desired menu item.

For instance, one of the sections of items to the immediate left or right in the menu may include dynamic suggestions populated by items that the system has determined that the user would be likely to do. For instance, these suggestions may include: (i) a tune to radio station item if the system determines that the user likes to listen to that radio station at that time of day; (ii) a call mom item if the system determined that the user has called his or her mom during that time of day or day of the week; and/or (iii) a find route home item if the system determines that the user is usually going home during that time of the day and week.

Because the menu may extend off screen, the menu is not limited to a specific quantity of items. Instead, the menu may include an infinite number of selections in either direction of the menu. These additional items may be loaded from off the sides of the touch screen as the user scrolls. Further aspects of the menu are described in detail below.

FIG. 1 illustrates an example system 100 including a computing device 102 for implementing a contextual quick pick menu surrounding a physical control 110 in proximity to a touchscreen 108. As shown, the computing device 102 includes a processor 104 that is operatively connected to a storage 106, to the touchscreen 108, and to the physical control 110. The storage 106 of the computing device 102 stores vehicle applications 114 which may provide user interfaces to the touchscreen 108 and receive input from the touchscreen 108. The storage 106 may further include a menu function 116 to allow the applications 114 to expose menu commands to the system 100 as well as to provide a visualization of the exposed menu commands to be displayed using the touchscreen 108 and selected using the physical control 110. It should be noted that this is merely an example, and computing devices 102 with more, fewer, or different components may be used.

The computing device 102 may include an in-vehicle infotainment system, such as a center stack or a rear-seat infotainment system. As some other examples, the computing devices 102 may be any of various types of portable computing device, such as cellular phones, tablet computers, smart watches, laptop computers, portable music players, or other devices having processing and communications capabilities.

The processor 104 may include one or more integrated circuits that implement the functionality of a central processing unit (CPU) and/or graphics processing unit (GPU). In some examples, the processor 104 is a system on a chip (SoC) that integrates the functionality of the CPU and GPU. The SoC may optionally include other components such as, for example, the storage 106 and a network device into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families. Additionally, alternative embodiments of the processor 104 can include microcontrollers, application specific integrated circuits (ASICs), field programmable gate arrays (FPGAs), digital signal processors (DSPs), or any other suitable digital logic devices.

During operation, the processor 104 executes stored program instructions that are retrieved from the storage 106. The stored program instructions include software that controls the operation of the processor 104 to perform the operations described herein. The storage 106 may include both non-volatile memory and volatile memory devices. The non-volatile memory includes solid-state memories, such as NAND flash memory, magnetic and optical storage media, or any other suitable data storage device that retains data when the computing device 102 is deactivated or loses electrical power. The volatile memory includes static and dynamic random-access memory (RAM) that stores program instructions and data during operation of the computing device 102.

The GPU may include hardware and software for display of at least two-dimensional (2D) and optionally three-dimensional (3D) graphics to the touchscreen 108. The touchscreen 108 may include various devices configured to display content as well as to receive touch input. In many examples, the touchscreen 108 may be a capacitive touch screen, but other possibilities are contemplated. In some examples, the processor 104 executes software programs using the hardware functionality in the GPU to accelerate the performance of machine learning or other computing operations described herein.

The physical control 110 may include any of various physical devices that enable the computing device 102 to receive control input from users. In many examples described herein, the physical control 110 is a knob. Other examples of suitable input devices that receive human interface inputs may include buttons, trackballs, and switches. In addition, the physical control 110 may further include touch-sensitive functionality or press functionality, such that the physical control 110 is able to sense that that is being touched or pressed, even if no rotational input is presently being input to the physical control 110.

The vehicle applications 114 are examples of stored program instructions that are retrieved from the storage 106 and executed by the processor 104 to provide information to the touchscreen 108. The vehicle applications 114 also receive input from the users, including touch input received by the touchscreen 108 as well as touch or other input received to the physical controls 110.

The menu function 116 may also be an example of program instructions that are retrieved from the storage 106 and executed by the processor 104. The menu function 116 may be programmed to communicate with the touchscreen 108 and physical controls 110 (e.g., at an operating system level or at a driver level), and may also be programmed to raise events or provide other communications between the applications 114 and the hardware of the computing device 102. In an example, the menu function 116 may receive input that the physical control 110 has been selected and may display a menu onto the touchscreen 108. The menu function 116 may further receive any rotational input applied to the physical control 110 in order to update the current selection of the menu. The menu function 116 may also receive additional press input from the physical control 110 to cause the menu function 116 to perform the function of the menu item that was selected.

Figure 2:
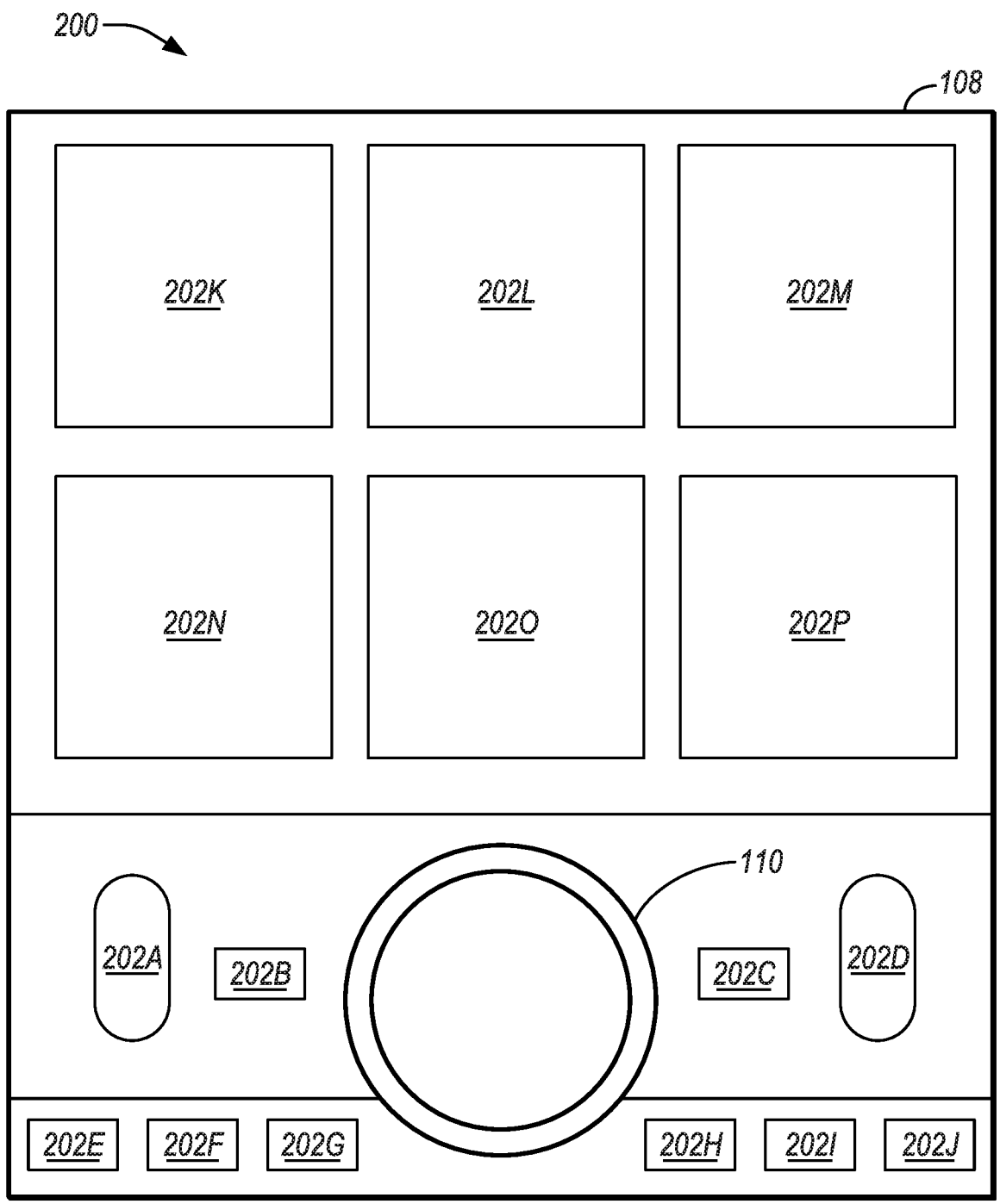
FIG. 2 illustrates an example user interface provided by a vehicle application to the touchscreen of the computing device.

FIG. 2 illustrates an example user interface 200 provided by a vehicle application 114 to the touchscreen 108 of the computing device 102. As shown, the user interface 200 includes a plurality of onscreen controls 202A-202P (collectively 202) that are drawn to the touchscreen 108 by one or more of the vehicle applications 114. The user interface 200 further includes the physical control 110, in this example the physical knob, where the physical control 110 is physically inset into the touchscreen 108. Using the user interface 200, a user may interact with the onscreen controls 202 by providing touch input via his or her fingers. Additionally, or alternatively, the user may interact with the physical control 110, for example, by providing press and/or rotational movement to the knob. This input may be provided to the menu function 116, which may display one or more menu visualizations to the touchscreen 108. These visualizations may be displayed above the onscreen controls 202 provided to the touch display. In some examples, the visualizations may be at least degree transparent or translucent, allowing aspects of the underlying onscreen controls 202 to be shown through the menu.

Figure 3:
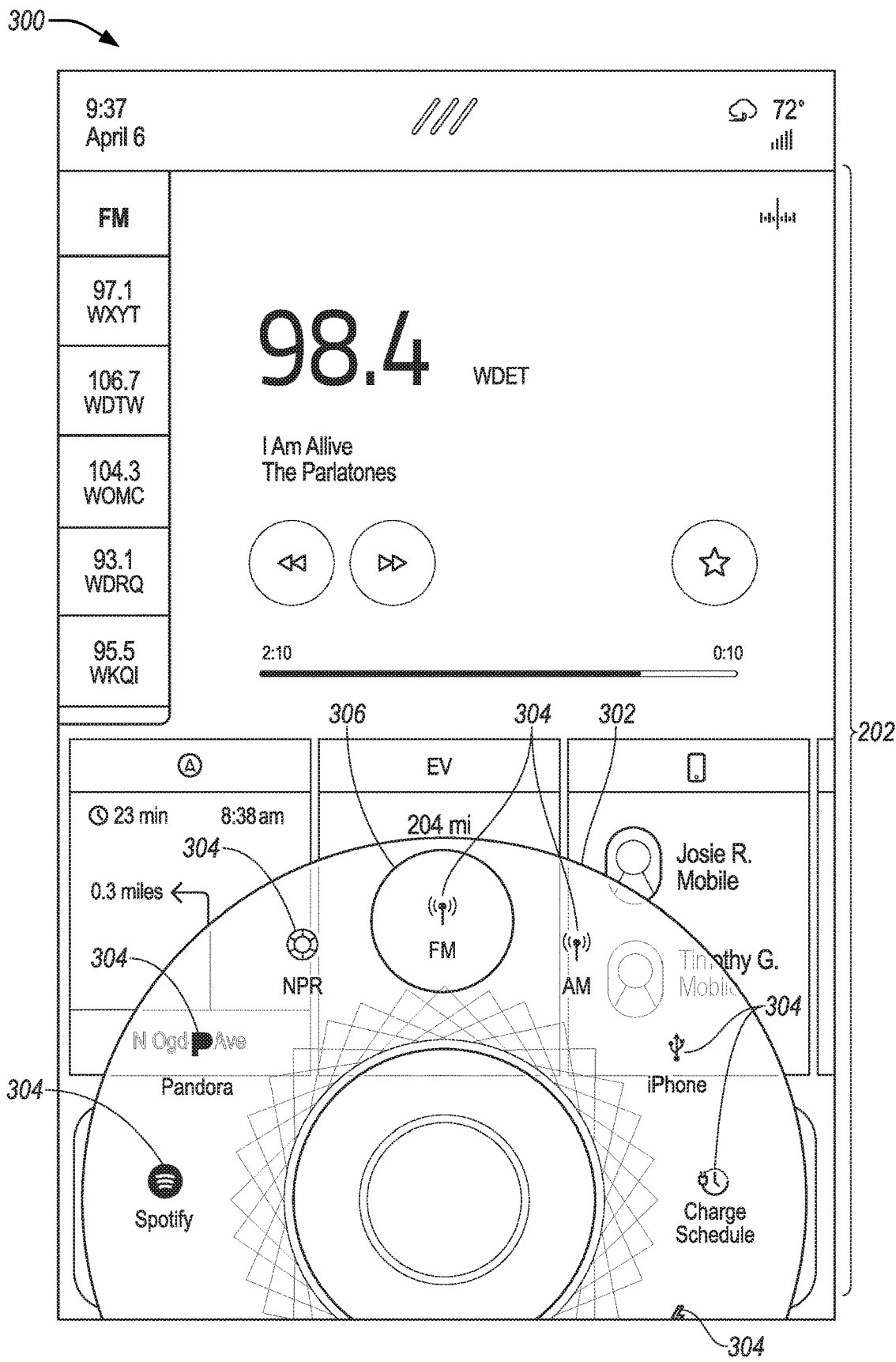
FIG. 3 illustrates an example user interface including a radial menu.

FIG. 3 illustrates an example user interface 300 including a radial contextual quick pick menu 302. As shown, the menu 302 is superimposed onto the onscreen controls 202 displayed to the touchscreen 108. The menu 302 includes a plurality of menu items 304. Each menu item 304 includes an icon graphically representing the function of the menu item 304 as well as text describing the menu items 304. As shown, the rotary menu 302 appears on the touch screen surrounding the physical control 110 inset into the touchscreen 108, thereby surfacing various single-press quick-pick actions as the menu items 304. As some possibilities, these menu items 304 may indicate actions to: (i) tune to a radio station; (ii) launch an application; (iii) call home; (iv) turn on the Max A/C; (v) give directions home, etc.

A predefined location of the menu 302 may indicate the selected item 306. For instance, as shown, the top position of the menu 302 is the selected item position 306. However, this is arbitrary and any position along the menu 302 may be the selected item position 306. The selected item position 306 may be displayed in a manner to distinguish which of the menu items 304 is at the selected item position 306.

Responsive to the menu function 116 receiving input from the physical control 110 indicative of clockwise or counter-clockwise rotation of the physical control 110, the menu function 116 may cause the rotary menu 302 to rotate the menu items clockwise or counterclockwise to select a different item as being the selected item 304. Pressing the physical control 110 again may perform the action corresponding to the menu items 304 at the selected item position 306.

Figure 4:
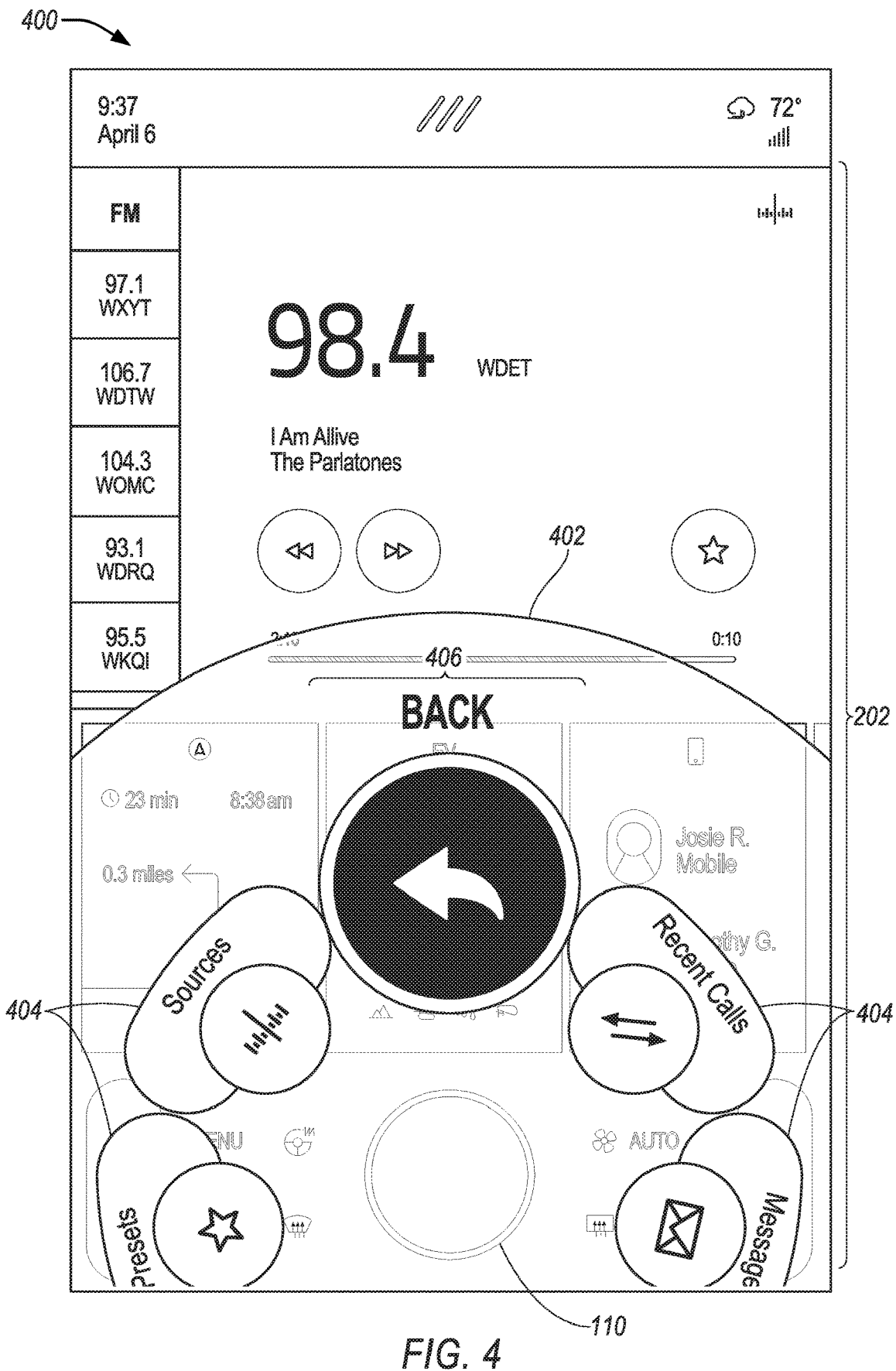
FIG. 4 illustrates an example user interface including an alternate radial menu having scalable ovals.

FIG. 4 illustrates an example user interface 400 including an alternate radial contextual quick pick menu 402 having scalable ovals. As shown, similar to the menu 302, the menu 402 is superimposed onto the onscreen controls 202 displayed to the touchscreen 108. The menu 402 also includes a plurality of menu items 404. However, as compared to the menu items 304 in the menu 302, in the menu 402 the menu items 404 each include a scalable oval indicating the text of the menu item 404 and a circular icon graphically representing the function.

The selected menu item 306 may be rendered differently, e.g., with the circular icon larger and the text of the scalable over larger and above the circular icon. By default, an exit item may be the selected menu item 306. This allows a user to quickly dismiss the menu 402 should the user have accidentally entered the menu 402. Tapping on the touchscreen 108 anywhere outside of the menu 402 may also cause the menu 402 to be dismissed. The menu 402 may also timeout after a period of inactivity and be automatically dismissed.

Figure 5:
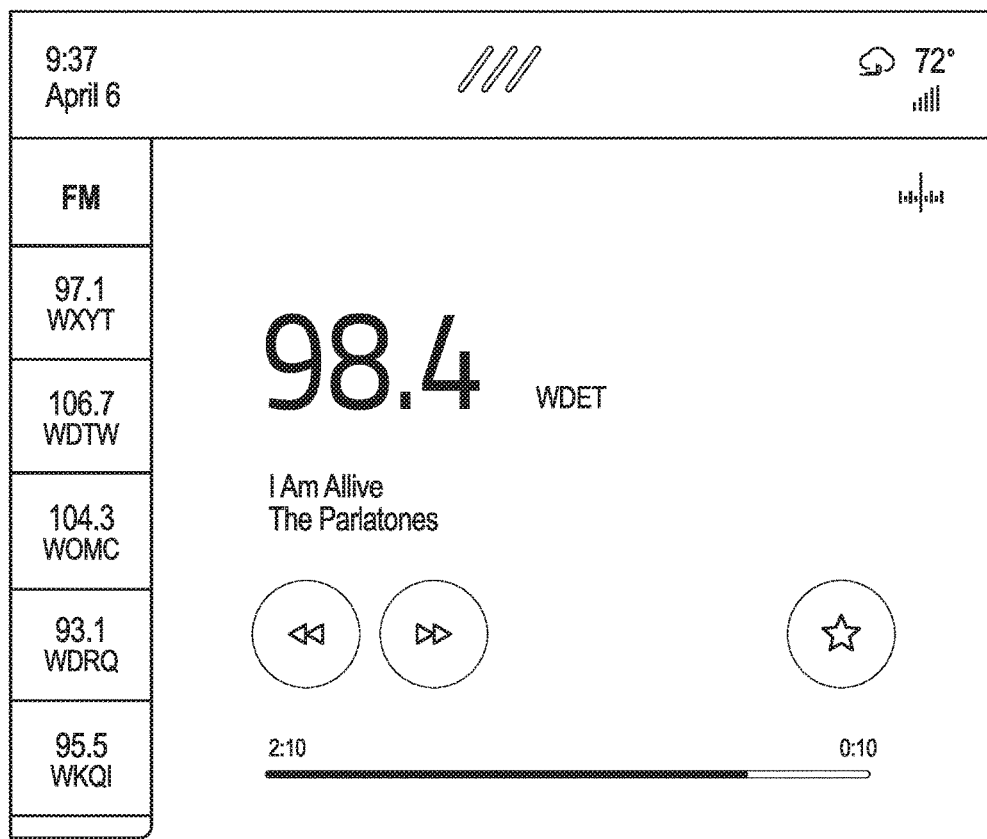
FIG. 5 illustrates an example user interface including an alternate radial menu using pie rings.
Figure 5:
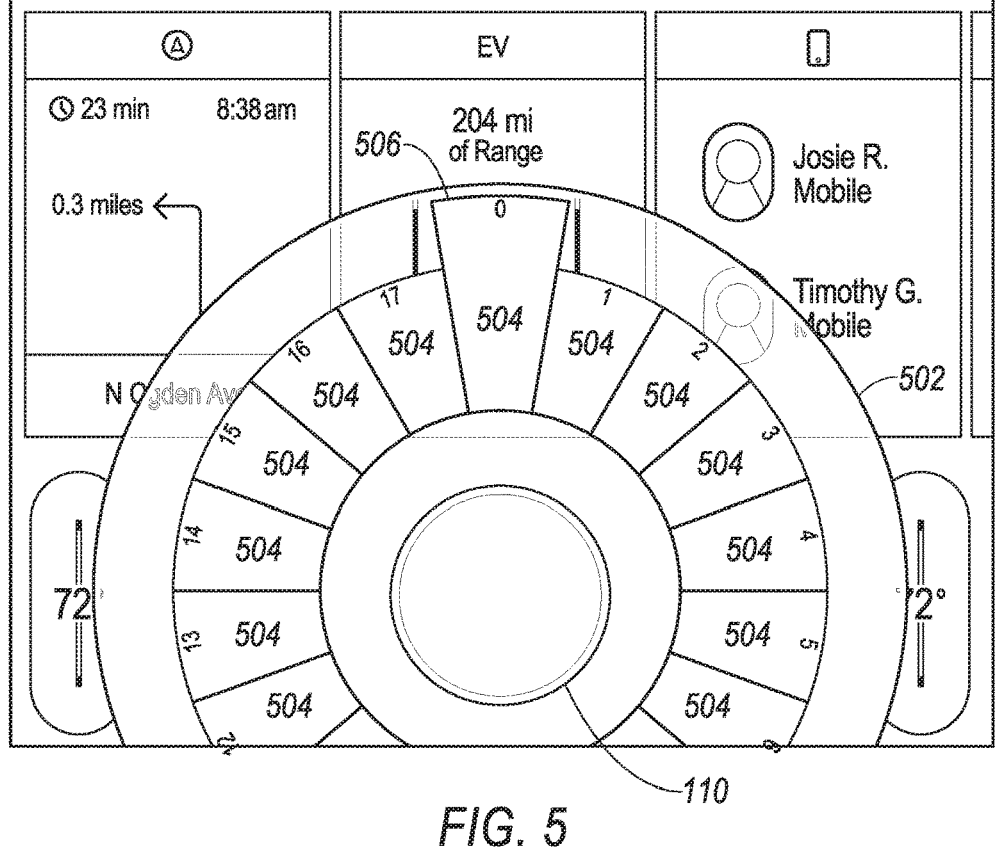

FIG. 5 illustrates an example user interface 500 including an alternate radial contextual quick pick menu 502 using pie rings. As shown, similar to the menus 302 and 402, the menu 502 is superimposed onto the onscreen controls 202 displayed to the touchscreen 108. The menu 502 also includes a plurality of menu items 504. However, as compared to the menus 302 and 402, in the menu 502 the menu items 504 each include a pie-shaped region of a ring of the menu 502. Each menu item 504 may be displayed with a different colored background to distinguish the menu item 504 from its neighboring menu items 504. The selected menu item 506 is rendered larger with the pie-shaped region extending radially outward from the ring of the menu 502.

Figure 6:
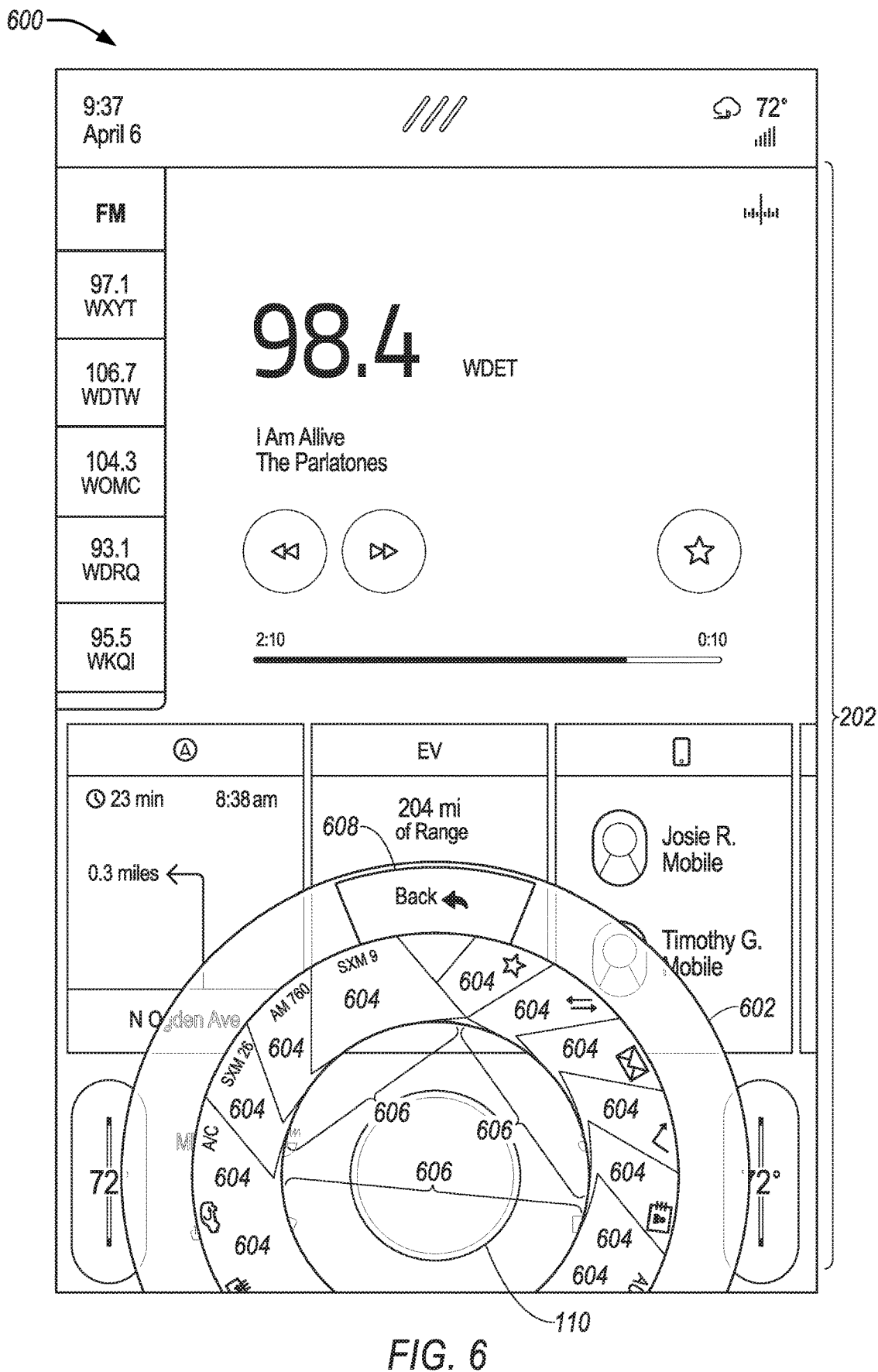
FIG. 6 illustrates an example user interface including an alternate radial menu using trapezoidal wedges.

FIG. 6 illustrates an example user interface 600 including an alternate radial contextual quick pick menu 602 using trapezoidal wedge menu items 604. Each of the trapezoidal wedge menu items 604 may be formed in the shape of a trapezoidal portion of a ring of the menu 602, with a longer side of the trapezoid being towards the center of the menu 602, and a shorter side of the trapezoid being away from the center of the menu 602. Each menu item 604 may include an icon and/or text descriptive of the function of the menu item 604.

The trapezoidal wedge menu items 604 may be arranged into include categories 606 of menu items 604. For instance, a first of the categories 606 may include menu items 604 corresponding to radio stations, a second of the categories 606 may include menu items 604 corresponding to HVAC settings, and a third of the categories 606 may include menu items 604 corresponding to use-specified favorites. These categories 606 may be displayed with different appearances (e.g., colors, gradients, textures, etc.) to visually indicate the common relationship of the menu items 604.

The selected menu item 608 may be rendered differently, e.g., in a ring outside of the ring of the menu items 604 and as a pie shape of that outer ring. As the menu 602 rotates, the menu item 604 at the top (or other position for the selected menu item 608) may transition to the outer ring, and as that menu item 604 leaves the selected position, the menu item 604 transitions back to the ring of trapezoidal menu items 604

Figure 7:
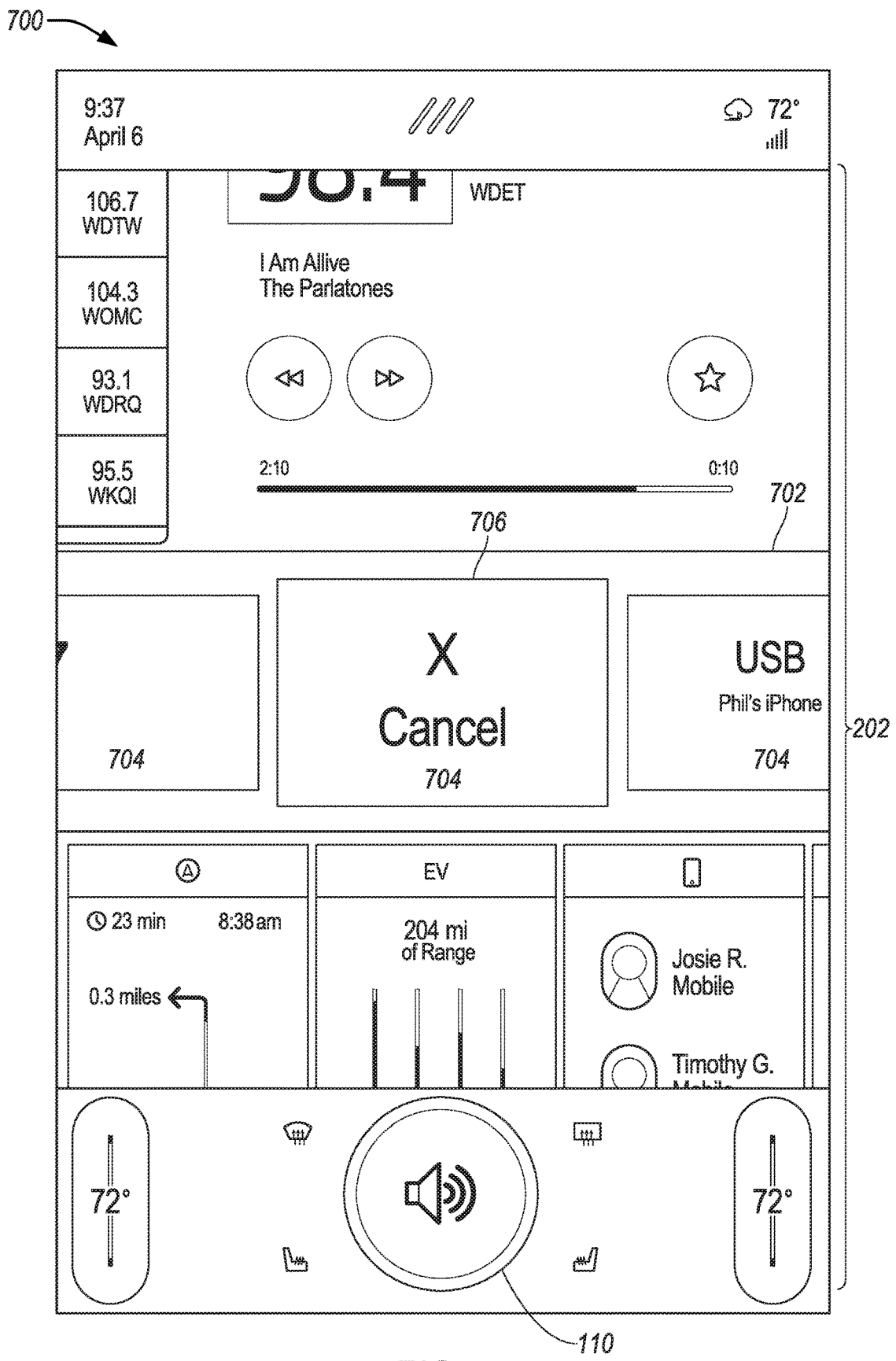
FIG. 7 illustrates an example user interface including an infinite linear menu.

FIG. 7 illustrates an example user interface 700 including an infinite linear contextual quick pick menu 702. As compared to the circular menus discussed earlier, the menu 702 instead includes a row of menu items 704 that move laterally based on turning of the physical control 110. As the menu 702 slides, the menu item 704 in the middle (or other position for the selected menu item 706) may transition to a larger size to indicate the selected state. Similarly, the menu item 704 leaving the selected menu item 706 may transition from the larger size back to a smaller normal to indicate losing the selected state.

Regardless of which specific menu embodiment is used, the menu may be a quick way to access features that are normally buried deeper within in the user interface. For instance, a shortcut to audio settings could be placed on a rotary or linear menu that would take the user to audio settings that would otherwise be buried several layers deep in screens. In some examples, items deemed to be most likely for the user to access may be placed immediately to the left or right of the initially selected exit item, to minimize the amount of turning of the physical control 110 in either direction that would be required to select the desired menu item.

For instance, one of the sections of items to the immediate left or right in the menu may include dynamic suggestions populated by items that the system 100 has determined that the user would be likely to do. For instance, these suggestions may include: (i) a tune to radio station item if the system determines that the user likes to listen to that radio station at that time of day; (ii) a call mom item if the system determined that the user has called his or her mom during that time of day or day of the week; and/or (iii) a find route home item if the system determines that the user is usually going home during that time of the day and week.

Because the menu may extend off-screen, the menu is not limited to a specific quantity of items. Instead, the menu may include an infinite number of selections in either direction of the menu. These additional items may be loaded from off the sides of the touch screen as the user scrolls.

Figure 8:
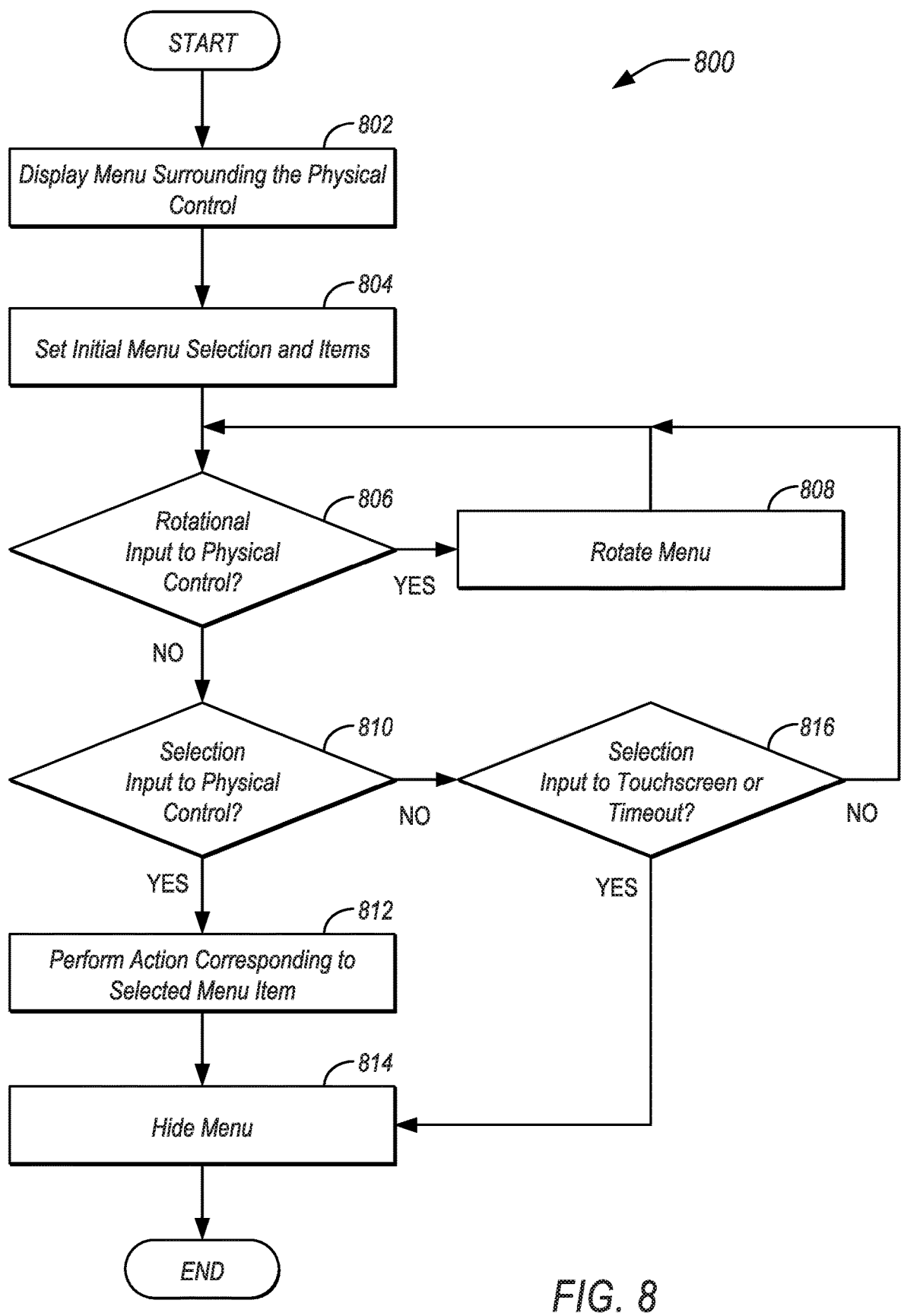
FIG. 8 illustrates an example process for implementing a contextual quick pick wheel.

FIG. 8 illustrates an example process 800 for implementing a contextual quick pick menu. In an example, the process 800 may be performed by the elements of the computing device 102 of the system 100 responsive to input to the physical control 110 to display a menu.

At operation 802, the computing device 102 displays a menu at least partially surrounding the physical control 110. The menu may have a plurality of menu item each associated with a respective action. The menu may overlay at least a portion of the onscreen controls 202. The menu may extend off-screen the touchscreen 108 to allow menu items to be loaded from the sides of the touchscreen 108 as the menu is rotated. Example menus may include the menus 302, 402, 502, 602, and 702 discussed in detail above.

At operation 804, the computing device 102 sets initial menu selection and menu items. In an example, the computing device 102 sets a selection of the menu to an exit menu item to allow a second selection input to the physical control 110 to dismiss the menu without performing an action. In another example, the computing device 102 includes, in the menu items adjacent to the initially-selected exit menu item, a listing of dynamic suggestions populated by menu items that the user has historically chosen.

At operation 806, the computing device 102 determines whether rotational input is received to the physical control 110. In an example, the physical control 110 is a knob, and the rotational input is clockwise or counterclockwise rotation of the knob. If such input is received, control passes to operation 808 to rotate the menu about the physical control 110 to change the selection of the menu. For instance, clockwise rotation of the knob one click or predefined amount may change the menu selection one item clockwise, while counterclockwise rotation of the knob one click or predefined amount may change the menu selection one item counterclockwise. After operation 808, control returns to operation 806. If, however, at operation 806 no rotational input is received to the physical control 110, control passes to operation 810.

At operation 810, the computing device 102 determines whether selection input is received to the physical control 110. In an example the physical control 110 may operate as a button, and may receive push input. If such input is received, control passes to operation 812 to perform the action corresponding to the selected menu item. After operation 812, control passes to operation 814 to hide the menu and the process 800 ends. If, however, at operation 810 no selection input is received to the physical control 110, control passes to operation 816.

At operation 816, the computing device 102 determines whether to hide the menu even if no selection input is received to the physical control 110. For instance, the computing device 102 may determine whether selection input was received to the touchscreen 108, as such input may dismiss the menu. If such input is received, control passes to operation 814. Additionally or alternately, the computing device 102 may determine whether no selection or rotational input has been received to the physical control 110 for at least a predefined period of time (e.g., five seconds as one possibility). If no such input has been received, then the computing device 102 may also deem the user wishes to dismiss the menu. If such a timeout has expired, control passes to operation 814. If no conditions to hide the menu have occurred, control returns to operation 806.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for displaying a menu, comprising:
a touchscreen, configured to display onscreen controls and to receive touch input;
a physical knob control, at least partially overlapping the touchscreen such that a rotatable circular menu item area centered on the physical knob control extends off-screen the touchscreen beyond the physical knob control, the physical knob control being additionally configured to receive touch input; and
a processor, programmed to
responsive to a first selection input to the physical knob control, display a menu in the rotatable circular menu item area, the menu at least partially surrounding the physical knob control, the menu having a plurality of menu items each associated with a respective action, the menu overlaying at least a portion of the onscreen controls and extending off-screen the touchscreen to allow menu items to be dynamically loaded from the sides of the touchscreen as the menu is rotated,
set a selection of the menu to an exit menu item to allow a second selection input to the physical knob control to dismiss the menu,
responsive to rotational input to the physical knob control, rotate the menu about the physical knob control to change the selection of the menu, and
responsive to receipt of the second selection input, perform the action of the menu item at the selection.

2. The system of claim 1, wherein the first selection input is a first press of the physical knob control, and the second selection input is a second press of the physical knob control.

3. The system of claim 1, wherein the processor is further programmed to include, in the menu items adjacent to the initially-selected exit menu item, a listing of dynamic suggestions populated by menu items that the user has historically chosen.

4. The system of claim 1, wherein each menu item is displayed as a section of a wheel, wherein the wheel extends off-screen the touchscreen, and the menu item at the selection of the menu is displayed larger than the other menu items.

5. The system of claim 1, wherein the menu items are displayed in a ring, where each unselected menu item is displayed as an ovular element including text descriptive of the menu item overlaid by a circular element including an icon descriptive of the menu item, and the selected menu item is displayed as a circular element larger than the circular elements of the unselected menu items including the icon descriptive of the menu item with the text descriptive of the selected menu item displayed above the selected menu item.

6. The system of claim 1, wherein each unselected menu item is displayed as a trapezoidal element within a first ring centered around the center of the physical knob control, and the selected element is displayed in a second ring centered around the center of the physical knob control and outside the first ring, wherein the trapezoidal elements are groups into categories of menu items according to function, each category being displayed with a different appearance to visually indicate the category of the included menu items.

7. The system of claim 1, wherein each menu item is displayed as a radial segment of a ring of the menu, wherein the selected menu item further extends radially outward from the ring of the menu.

8. A method for displaying a menu, comprising:
responsive to a first selection input to a physical knob control at least partially overlapping a touchscreen such that a rotatable circular menu item area centered on the physical knob control extends off-screen the touchscreen beyond the physical knob control, displaying a menu in the rotatable circular menu item area, the menu at least partially surrounding the physical knob control, the menu having a plurality of menu items each associated with a respective action, the menu overlaying at least a portion of onscreen controls and extending off-screen the touchscreen to allow menu items to be dynamically loaded from the sides of the touchscreen as the menu is rotated;
setting a selection of the menu to an exit menu item to allow a second selection input to the physical knob control to dismiss the menu;
responsive to rotational input to the physical knob control, rotating the menu about the physical knob control to change the selection of the menu; and
responsive to receipt of the second selection input, performing the action of the menu item at the selection.

9. The method of claim 8, wherein the first selection input is a first press of the physical knob control, and the second selection input is a second press of the physical knob control.

10. The method of claim 8, further comprising including, in the menu items adjacent to the initially-selected exit menu item, a listing of dynamic suggestions populated by menu items that the user has historically chosen.

11. The method of claim 8, wherein each menu item is displayed as a section of a wheel extending off-screen the touchscreen, and the menu item at the selection of the menu is displayed larger than the other menu items.

12. The method of claim 8, wherein the menu items are displayed in a ring, where each unselected menu item is displayed as an ovular element including text descriptive of the menu item overlaid by a circular element including an icon descriptive of the menu item, and the selected menu item is displayed as a circular element larger than the circular elements of the unselected menu items including the icon descriptive of the menu item with the text descriptive of the selected menu item displayed above the selected menu item.

13. The method of claim 8, wherein each unselected menu item is displayed as a trapezoidal element within a first ring centered around the center of the physical knob control, and the selected element is displayed in a second ring centered around the center of the physical knob control and outside the first ring, wherein the trapezoidal elements are groups into categories of menu items according to function, each category being displayed with a different appearance to visually indicate the category of the included menu items.

14. The method of claim 8, wherein each menu item is displayed as a radial segment of a ring of the menu, wherein the selected menu item further extends radially outward from the ring of the menu.

15. A non-transitory computer-readable medium comprising instructions that, when executed by a processor of a system including a touchscreen and a physical knob control at least partially overlapping the touchscreen such that a rotatable circular menu item area centered on the physical knob control extends off-screen the touch screen beyond the physical knob control, cause the processor to:

responsive to a first press input to a physical knob control at least partially overlapping a touchscreen, display a menu at least partially surrounding the physical knob control, the menu having a plurality of menu items each associated with a respective action, the menu overlaying at least a portion of onscreen controls and extending off-screen the touchscreen to allow menu items to be dynamically loaded from the sides of the touchscreen as the menu is rotated;

set a selection of the menu to an exit menu item to allow a second selection input to the physical knob control to dismiss the menu;

responsive to rotational input to the physical knob control, rotate the menu about the physical knob control to change the selection of the menu; and responsive to receipt of a second press input to the physical knob control, perform the action of the menu item at the selection.

16. The medium of claim 15, further comprising instructions that, when executed by the processor, cause the processor to perform operations including to include, in the menu items adjacent to the initially-selected exit menu item, a listing of dynamic suggestions populated by menu items that the user has historically chosen.

17. The medium of claim 15, wherein each menu item is displayed as a section of a wheel extending off-screen the touchscreen, and the menu item at the selection of the menu is displayed larger than the other menu items.

18. The medium of claim 15, wherein the menu items are displayed in a ring, where each unselected menu item is displayed as an ovular element including text descriptive of the menu item overlaid by a circular element including an icon descriptive of the menu item, and the selected menu item is displayed as a circular element larger than the circular elements of the unselected menu items including the icon descriptive of the menu item with the text descriptive of the selected menu item displayed above the selected menu item.

19. The medium of claim 15, wherein each unselected menu item is displayed as a trapezoidal element within a first ring centered around the center of the physical knob control, and the selected element is displayed in a second ring centered around the center of the physical knob control and outside the first ring, wherein the trapezoidal elements are groups into categories of menu items according to function, each category being displayed with a different appearance to visually indicate the category of the included menu items.

20. The medium of claim 15, wherein each menu item is displayed as a radial segment of a ring of the menu, wherein the selected menu item further extends radially outward from the ring of the menu.

\* \* \* \* \*